US 6,651,019 B2
Nov. 18, 2003

(12) United States Patent
Mizuguchi et al.

(54) METHOD AND APPARATUS FOR CALCULATING CORRECTION VALUE FOR THERMAL DISPLACEMENT IN MACHINE TOOL

(75) Inventors: Hiroshi Mizuguchi, Yamatokoriyama (JP); Masaaki Yokoyama, Yamatokoriyama (JP); Kazutada Hashimoto, Yamatokoriyama (JP); Mikio Iwakiri, Yamatokoriyama (JP); Munetaka Wakizaka, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 93 days.

(21) Appl. No.: 09/949,834

(22) Filed: Sep. 12, 2001

(65) Prior Publication Data

US 2002/0038189 A1 Mar. 28, 2002

(30) Foreign Application Priority Data

Sep. 13, 2000 (JP) .......................... 2000-278426

(51) Int. Cl.⁷ .................... G01C 17/38; G06F 19/00
(52) U.S. Cl. .................. 702/94; 702/97; 702/99; 700/192; 700/193; 700/194
(58) Field of Search .................. 702/94, 97, 99, 702/155, 157, 158, 170; 700/192, 193, 194, 174

(56) References Cited

U.S. PATENT DOCUMENTS 5,895,181 A * 4/1999 Ito et al. ............. 409/132
6,456,896 B1 * 9/2002 Ito et al. ............. 700/193

FOREIGN PATENT DOCUMENTS

JP 9-085581 3/1997

* cited by examiner

*Primary Examiner*—John Barlow
*Assistant Examiner*—Meagan S Walling
(74) *Attorney, Agent, or Firm*—Armstrong, Westerman & Hattori, LLP (57) ABSTRACT

A method and apparatus by which accurate correction values for thermal displacement is calculated even when the rotation of the main spindle is restarted after interruption. The apparatus has means 2, 3 for measuring the temperature near the main spindle 15, means 5 for estimating the thermal displacement of the main spindle 15 on the basis of the measured temperature and a predetermined thermal displacement calculation expression, means 7 for calculating the correction value, and means 6 which estimates the displacement delay in re-rotation caused by the interruption of the rotation of the main spindle 15, and calculates an adjusting displacement on the basis of the estimated displacement delay. The correction value calculating means 7 calculates a correction value on the basis of the thermal displacement estimated by the thermal displacement estimating means 5 alone when the main spindle 15 is started up and rotated.

9 Claims, 4 Drawing Sheets

METHOD AND APPARATUS FOR CALCULATING CORRECTION VALUE FOR THERMAL DISPLACEMENT IN MACHINE TOOL

BACKGROUND OF THE INVENTION

1. Field of the Invention

The present invention relates to a method and apparatus for calculating correction values for thermal displacement occurring along an axis of a main spindle in a machine tool.

2. Description of the Prior Art

Figure 4:
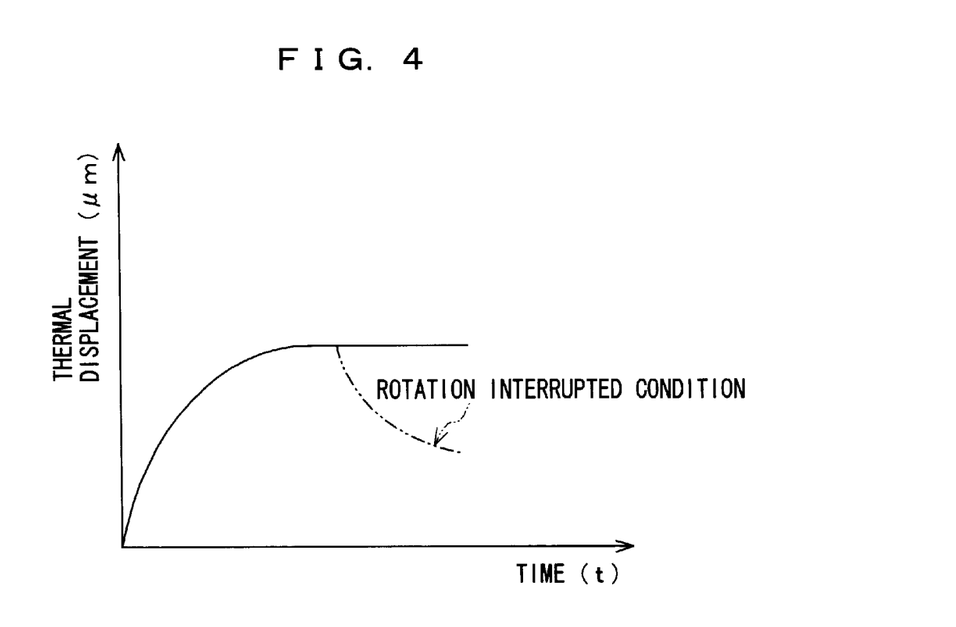
FIG. 4 is a view for explanation of thermal displacement in the machine tool.

A machine tool has sources of the heat generation at respective portions, and from these sources of the heat generation, heat is transmitted and causes the respective portions of the machine tool to thermally deform. Particularly, the bearing rotatably holding the main spindle generates heat due to rolling of a rolling element, and the main spindle expands, and this causes machining errors. FIG. 4 shows the condition where the main spindle thermally displaces (expands) with time after the main spindle is rotated. As shown in the figure, after the rotation is started, the main spindle expands at a predetermined time constant, and then turns into a steady state soon thereafter.

Conventionally, a liquid coolant is supplied and circulated in a housing that holds the main spindle to cool the bearing, and in addition, the temperature in the vicinity of the main spindle is measured, the amount of thermal displacement of the main spindle is estimated on the basis of the measured temperature, and a correction value is calculated on the basis of the estimated thermal displacement amount, and tool offset is made on the basis of the calculated correction value, whereby the thermal displacement is canceled.

In a running condition where the main power supply of the machine tool is turned on, the main spindle is not always rotated, but occasionally stopped. For example, in the case of a machining center, when a tool that has reached the wearing limit is replaced with a new one, the rotation of the main spindle must be interrupted in order to set a tool offset value of the replaced tool. Also, in a case where a workpiece after being machined is measured on the machine tool, the rotation of the main spindle must be interrupted. When the rotation is interrupted, the main spindle is cooled, and as shown by the chain double-dashed line in FIG. 4, the amount of thermal displacement decreases, that is, the main spindle contracts.

Figure 5:
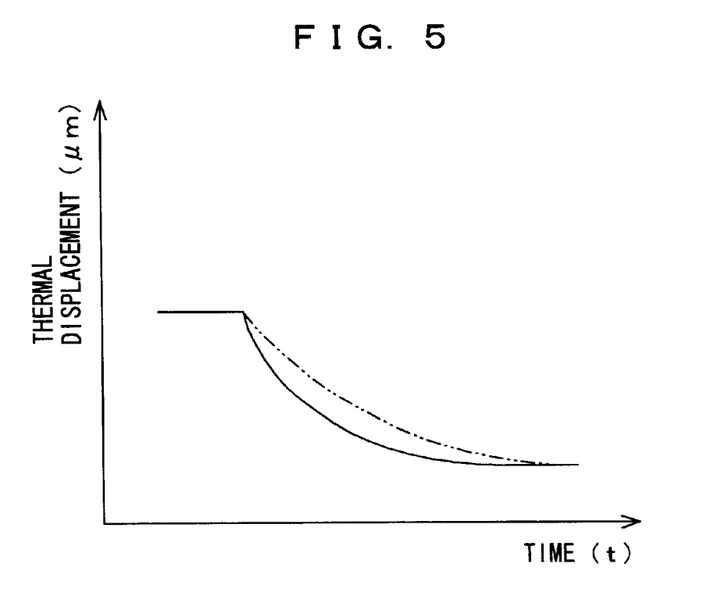
FIG. 5 is a view for explanation of thermal displacement in the machine tool.

However, as mentioned above, in a machine tool constructed so that the bearing is cooled by a liquid coolant, the cooling condition in the vicinity of the main spindle to be measured, that is, the cooling condition in the vicinity of the bearing does not always agree with the cooling condition of the main spindle itself, so that a phenomenon in which the main spindle is cooled later occurs. Therefore, the actual contraction amount of the main spindle is smaller than the contraction amount estimated on the basis of the measured temperature in the vicinity of the main spindle. In other words, the actual contraction of the main spindle is delayed from the estimated contraction on the basis of the measured temperature in the vicinity of the main spindle. This condition is shown in FIG. 5. In FIG. 5, the actual contraction condition of the main spindle is shown by the chain double-dashed line, and the estimated contraction condition on the basis of the measured temperature in the vicinity of the main spindle is shown by the continuous line.

Figure 6:
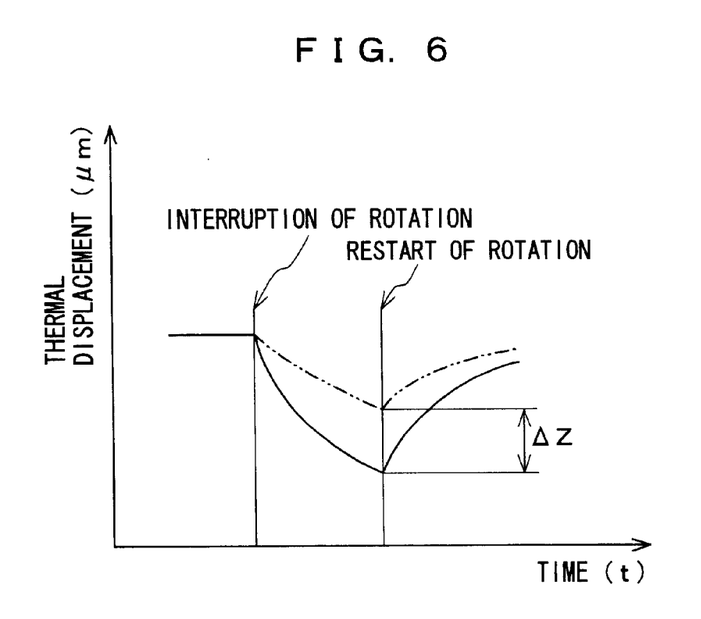
FIG. 6 is a view for explanation of thermal displacement in the machine tool.

When the main spindle is re-rotated, the temperature of the main spindle rises again due to heat generated from the bearing. This condition is shown in FIG. 6. In FIG. 6, in the same manner as mentioned above, the actual contraction and expansion conditions of the main spindle are shown by the chain e double-dashed line, and the estimated contraction and expansion conditions on the basis of the measured temperature in the vicinity of the main spindle are shown by the continuous line. As shown in FIG. 6, in the condition where the main spindle is re-rotated, the actual contraction amount of the main spindle has a delay amount $\Delta Z$ to the contraction amount estimated on the basis of the measured temperature in the vicinity of the main spindle, and thereafter, with the elapse of time, the main spindle temperature and the temperature in the vicinity of the main spindle reach the same temperature, and the abovementioned delay amount converges at zero.

As mentioned above, when the main spindle is re-rotated, the actual contraction amount of the main spindle is delayed by $\Delta Z$ to the estimated contraction amount on the basis of the measured temperature in the vicinity of the main spindle. Therefore, when the correction value is calculated on the basis of the estimated contraction amount, an error corresponding to the delay amount $\Delta Z$ to the actual contraction amount of the main spindle occurs, so that accurate correction cannot be made.

In a case where a tool offset value is set for a replaced tool or a workpiece after being machined is measured on the machine tool during the interruption of the rotation of the main spindle, if correction is made on the basis of the estimated contraction amount having an error to the actual contraction amount of the main spindle, accurate setting of the tool offset value and accurate measurements of the workpiece cannot be made.

The invention is made in view of the abovementioned circumstances, and the object thereof is to provide a method and apparatus for calculating a correction value for thermal displacement in a machine tool whereby accurate correction values can be calculated when the rotation of the main spindle is interrupted or the rotation of the main spindle is restarted.

SUMMARY OF THE INVENTION

In order to solve the abovementioned problems, the present invention relates to a method for calculating a correction value for thermal displacement occurring along an axis of a main spindle in a machine tool, the method comprising the steps of:

measuring a temperature in the vicinity of the main spindle;

estimating an amount of the thermal displacement on the basis of the measured temperature and a predetermined thermal displacement amount calculation expression; and calculating the correction value on the basis of the estimated thermal displacement amount, wherein, when the main spindle is continuously rotated without interruption after start-up thereof, the correction value is calculated on the basis of the estimated thermal displacement amount alone; and wherein, when the rotation of the main spindle is restarted after interruption thereof, an amount of displacement delay occurring due to the interruption is estimated, and the correction value is calculated on the basis of the estimated displacement delay amount and the estimated thermal displacement amount.

In the invention, the amount of thermal displacement occurring along the axis of the main spindle on the basis of the measured temperature in the vicinity of the main spindle is estimated. After the main spindle is started up, when the main spindle is continuously rotated without interruption, a correction value is calculated on the basis of the estimated thermal displacement amount alone, and on the other hand, when the rotation of the main spindle is restarted after interruption thereof, the amount of displacement delay occurring due to the interruption is estimated, and a correction value is calculated on the basis of the estimated displacement delay amount and the estimated thermal displacement amount. Therefore, as mentioned above, when the rotation of the main spindle is restarted after interruption thereof, even in a case where the actual contraction amount (displacement amount) of the main spindle has a delay amount to the contraction amount (displacement amount) estimated on the basis of the measured temperature in the vicinity of the main spindle, a correction value is calculated on the basis of the delay amount as described above, whereby accurate correction can be made.

To calculate a correction value on the basis of the displacement delay amount and the estimated thermal displacement amount can be carried out by the following, that is, an adjusting displacement amount is calculated on the basis of the estimated displacement delay amount, and the correction value is calculated on the basis of a displacement amount obtained by addition or subtraction of the adjusting displacement amount to/from the estimated thermal displacement amount.

On the supposition that the adjusting displacement amount is $\delta_c$, this amount can be calculated from the following expression.

$$\delta_c = \Delta Z \times \exp(-t_c/T_c)$$

(In this expression, $\Delta Z$ is the displacement delay amount ($\mu$m) at the restart of the rotation of the main spindle, $T_c$ is a time constant, and $t_c$ is a time (s) elapsed from the restart of the rotation of the main spindle.)

The displacement amount obtained by addition or subtraction of the adjusting displacement amount calculated from such a calculation expression to/from the estimated thermal displacement amount is approximate to the actual displacement amount of the main spindle. Therefore, by calculating a correction value on the basis of this displacement amount, a more accurate correction can be made.

The abovementioned method for calculating the correction value can be preferably carried out by the following apparatus. That is, the apparatus for calculating a correction value for thermal displacement occurring along an axis of a main spindle in a machine tool, the apparatus comprising:

temperature measuring means for measuring a temperature in the vicinity of the main spindle;

thermal displacement amount estimating means for estimating an amount of the thermal displacement on the basis of the temperature measured by the temperature measuring means and a predetermined thermal displacement amount calculation expression;

correction value calculating means for calculating the correction value on the basis of the thermal displacement amount estimated by the thermal displacement amount estimating means; and adjusting displacement amount calculating means for estimating an amount of displacement delay occurring when rotation of the main spindle is restarted after interruption thereof, and calculating an adjusting displacement amount on the basis of the estimated displacement delay amount;

wherein, when the main spindle is continuously rotated without interruption after start-up thereof, the correction value calculating means calculates the correction value on the basis of the thermal displacement amount estimated by the thermal displacement amount estimating means alone;

wherein, when the rotation of the main spindle is restarted after the interruption thereof, the correction value calculating means calculates a displacement amount by adding or subtracting the adjusting displacement amount calculated by the adjusting displacement amount calculating means to/from the thermal displacement amount estimated by the thermal displacement amount estimating means, and calculates the correction value on the basis of the displacement amount.

The adjusting displacement amount calculating means can be constructed so as to calculate the adjusting displacement amount $\delta_c$ from the following expression.

$$\delta_c = \Delta Z \times \exp(-t_c/T_c)$$

(In this expression, $\Delta Z$ is the displacement delay amount ($\mu$m) at the restart of the rotation of the main spindle, $T_c$ is a time constant, and $t_c$ is a time (s) elapsed from the restart of the rotation of the main spindle.)

In accordance with the method of the invention for calculating a correction value for thermal displacement, when the rotation of the main spindle is interrupted, an amount of displacement occurring along the axis of the main spindle during the interruption is estimated on the basis of an amount of the thermal displacement estimated on the basis of a temperature measured immediately before the interruption and a predetermined delay amount to the estimated thermal displacement amount, and the correction value can be calculated on the basis of the estimated displacement amount.

According to the invention, when the rotation of the main spindle is interrupted, an amount of displacement occurring along the axis of the main spindle during the interruption is estimated on the basis of an amount of the thermal displacement estimated on the basis of a temperature measured immediately before the interruption and a predetermined delay amount to the estimated thermal displacement amount, that is, a displacement amount approximate to the actual displacement amount of the main spindle during the interruption is estimated, and the correction value during the interruption is calculated on the basis of this estimated displacement amount. Therefore, a more accurate correction can be made for thermal displacement of the main spindle during the interruption of the rotation. Thereby, setting of a tool offset value after replacing the tool or workpiece measurements on the machine tool during the interruption can be made with high accuracy.

The method of the invention can be preferably carried out by the following apparatus. That is, the apparatus is constructed so that, when the rotation of the main spindle is interrupted, the correction value calculating means estimates an amount of displacement occurring along the axis of the main spindle during the interruption on the basis of an amount of the thermal displacement estimated on the basis of a temperature measured immediately before the interruption and a predetermined delay amount to the estimated thermal displacement amount, and calculates the correction value on the basis of the estimated displacement amount.

The amount $\delta_B$ of the displacement occurring along the axis of the main spindle during the interruption can be calculated from the following expression.

$$\delta_B = \delta_{A1} \times \exp(-t_B/T_B)$$

(In the above expression, $\delta_{A1}$ is the estimated thermal displacement amount immediately before the interruption of the rotation of the main spindle, $T_B$ is a time constant, and $t_B$ is a elapsed time from interruption of the rotation of the main spindle.)

DESCRIPTION OF THE PREFERRED EMBODIMENT

Figure 1:
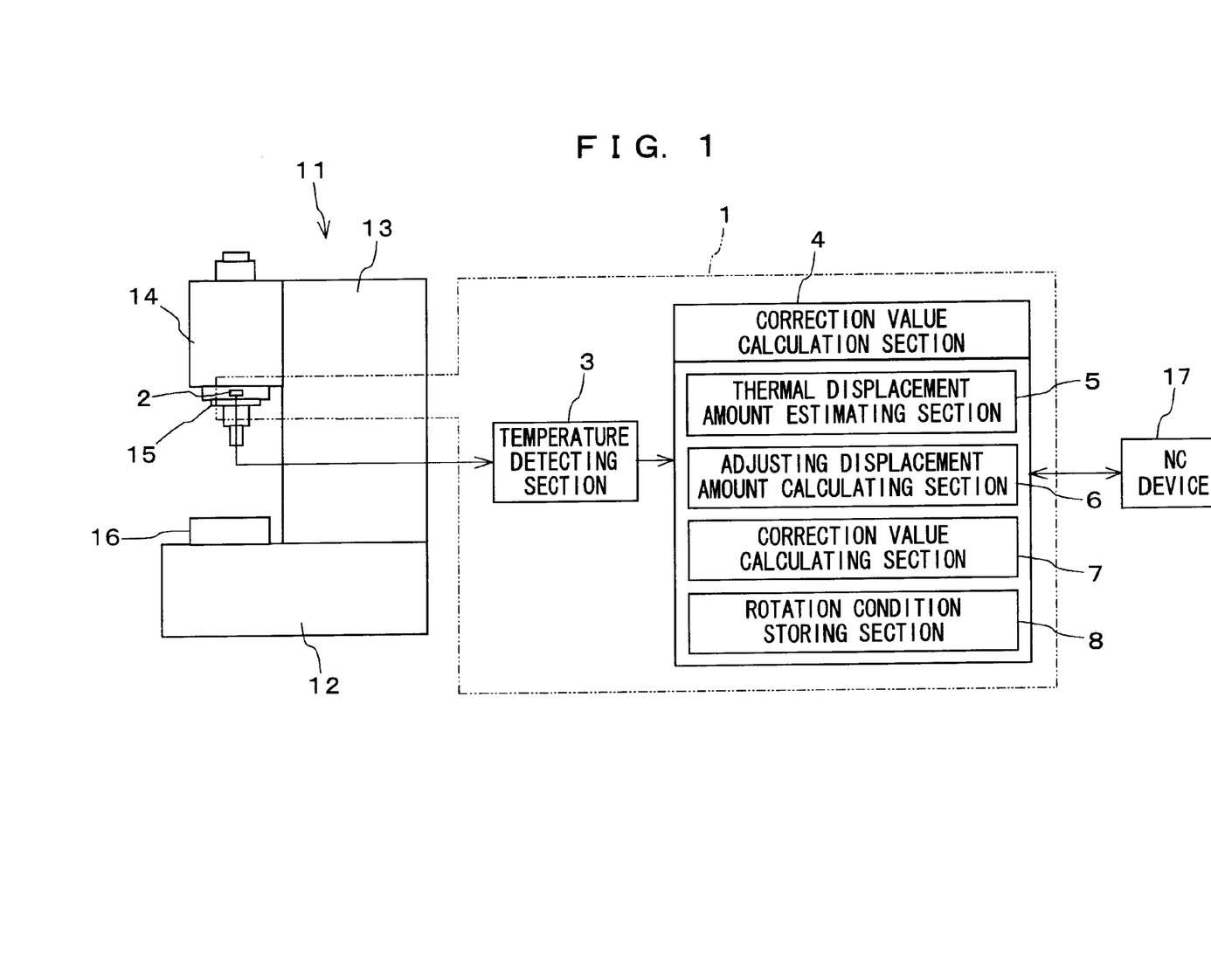
FIG. 1 is a block diagram showing a schematic construction of the apparatus for calculating the correction value relating to an embodiment of the invention.

Hereinafter, a concrete embodiment of the invention is by explained with reference to the attached drawings. FIG. 1 is a block diagram showing the schematic construction of a apparatus for calculating a correction value relating to the present embodiment.

As shown in FIG. 1, the apparatus 1 for calculating the correction value of the present embodiment comprises a temperature sensor 2 provided at the lower end of a main spindle head 14 comprising a machine tool 11, a temperature detecting section 3 for detecting the temperature at the lower end of the main spindle head 14 by receiving a detection signal from this temperature sensor 2, and correction value calculation section 4 which receives temperature data detected by the temperature detecting section 3, calculates an amount of the thermal displacement of the main spindle 15 and a correction value in accordance with this amount of the thermal displacement, and transmits the calculated correction value to a NC device 17. In addition, in the figure, 12 denotes a bed, 13 denotes a column, and 16 denotes a table.

For the temperature sensor 2 of the embodiment, a contact type sensor comprising a thermistor, bimetal, thermocouple and the like, and a non-contact type sensor using thermal radiation can be used. The temperature detecting section 3 samples detection signals transmitted from the temperature sensor 2 at every prescribed time to prepare temperature data, and transmits the prepared temperature data to the correction value calculation section 4, successively.

As shown in the figure, the correction value calculation section 4 comprises thermal displacement amount estimating section 5, adjusting displacement amount calculating section 6, correction value calculating section 7 and rotation condition storing section 8.

The thermal displacement amount estimating section 5 receives temperature data successively transmitted from the temperature detecting section 3, calculates the amount of the thermal displacement of the main spindle 15 on the basis of the received temperature data and a predetermined thermal displacement amount calculation expression, and successively transmits the calculated thermal displacement data to the adjusting displacement amount calculating section 6 and correction value calculating section 7. The thermal displacement amount calculation expression is a calculation expression that is experientially set based on the relationship between the temperature data, which is obtained by measuring the temperature at the lower end of the main spindle head 14 by the temperature sensor 2 and temperature detecting section 3 upon rotating the main spindle 15, and displacement data, which is obtained by measuring the displacement of the main spindle 15 in accordance with the temperature by using a displacement meter, and for example, the following thermal displacement amount calculation expression can be obtained.

$$\delta_A = \alpha \times \Delta K_t + \beta$$

In the above expression, $\delta_A$ is the thermal displacement amount, $\alpha$ is a coefficient, $\Delta K_t$ is the rise of temperature to the predetermined reference temperature at the time t, and $\beta$ is a constant (correction term).

The rotation condition storing section 8 receives the rotation condition of the main spindle 15 from the NC device 17, and stores the period of rotation and period of interruption of the main spindle 15 in time series.

The adjusting displacement amount calculating section 6 executes processing for estimating a difference between the actual displacement amount of the main spindle 15 after the interruption of the rotation of the main spindle 15 and the displacement amount estimated by the thermal displacement amount estimating section 5, that is, an amount of displacement delay.

Figure 3:
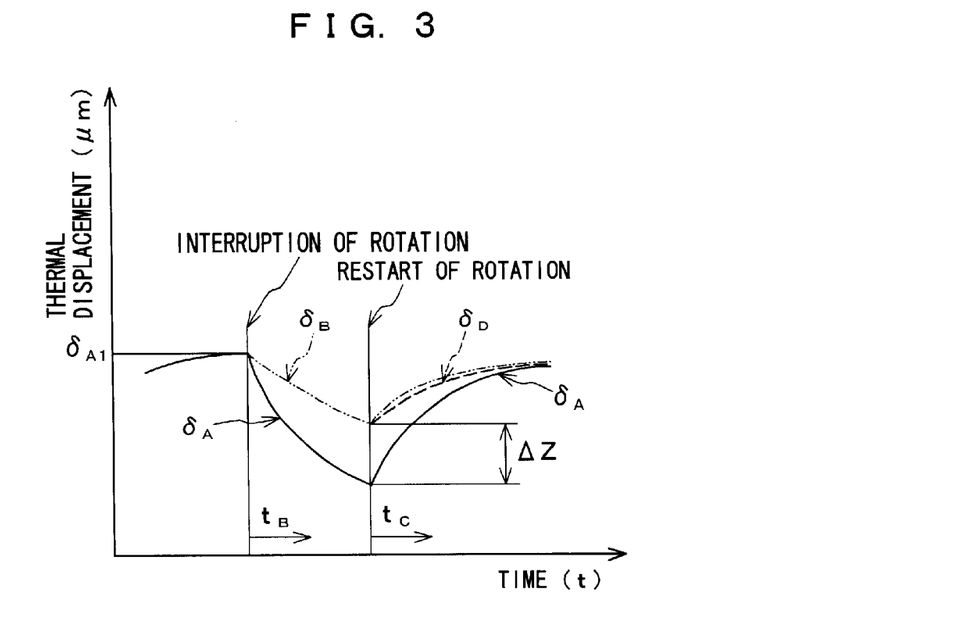
FIG. 3 is a view for explanation of the action of the apparatus for calculating the correction value relating to the embodiment.

Concretely, first, after the main spindle 15 is continuously rotated at a predetermined rotational speed, the rotation is interrupted, and the displacement of the main spindle 15 that changes over time is measured by using a displacement meter. Then, the displacement expression after the interruption of the rotation is experientially set based on the obtained displacement data. The displacement expression thus set is, for example, as follows (see FIG. 3).

$$\delta_B = \delta_{A1} \times \exp(-t_B/T_B)$$

In this expression, $\delta_B$ is the displacement amount, and $\delta_{A1}$ is the estimated thermal displacement amount immediately before the interruption of the rotation, which has been calculated by the thermal displacement amount estimating section 5. $t_B$ is a time elapsed from the interruption of the rotation, and $T_B$ is a time constant.

The adjusting displacement amount calculating section 6 receives a rotation stop signal from the NC device 17, and calculates an amount $\Delta Z_{tB}$ of displacement delay on the basis of the estimated thermal displacement amount $\delta_A$ transmitted from the thermal displacement amount estimating section 5 and the above predetermined expression. This calculation can be expressed from the following operation expression.

$$\Delta Z_{tB} = \delta_B - \delta_A$$

That is, $$\Delta Z_{tB} = \{\delta_{A1} \times \exp(-t_B/T_B)\} - (\alpha \times \Delta K_{tB} + \beta)$$

$\Delta K_{tB}$ is the temperature data at the same time as $t_B$.

When the rotation of the main spindle 15 is restarted, the adjusting displacement amount calculating section 6 receives a rotation signal from the NC device 17, and on the basis of the amount $\Delta Z_{tB}$ of displacement delay (referred to as $\Delta Z$) immediately before the restart of the rotation that has been calculated as mentioned above, executes processing for calculating an adjusting displacement amount $\delta_c$, and transmits the calculated adjusting displacement amount $\delta_c$ data to the correction value calculating section 7. Concretely, the calculation is carried out from the following expression.

$$\delta_c = \Delta Z \times \exp(-t_c/T_c)$$

$t_c$ is a time elapsed from the restart of the rotation of the main spindle 15, and $T_c$ is a time constant.

Figure 2:
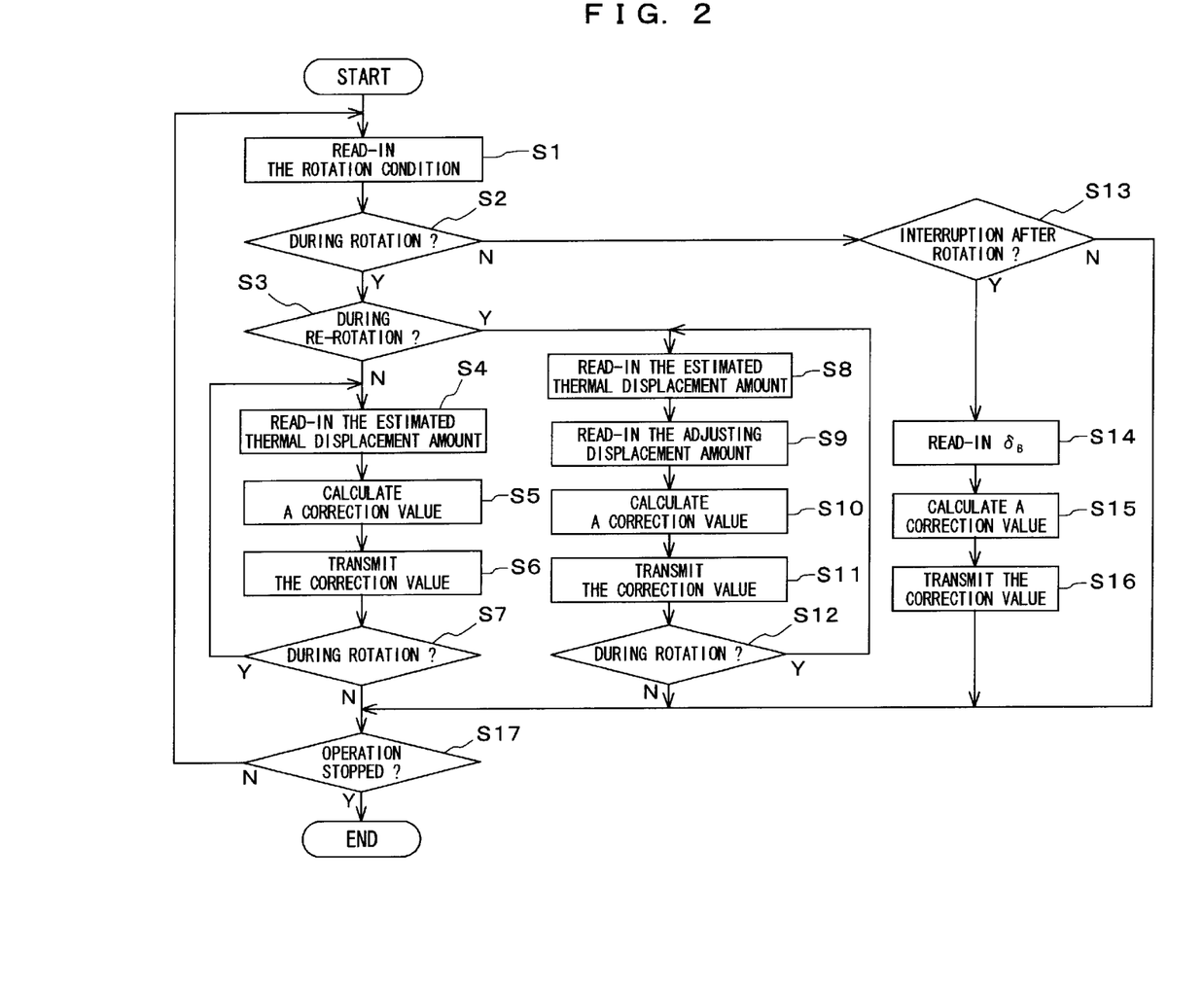
FIG. 2 is a flowchart showing the details of processing in the correction value calculating section relating to the present embodiment.

The correction value calculating section 7 receives a signal regarding the rotation condition of the main spindle 15 from the NC device 17, receives data from the thermal displacement amount estimating section 5, adjusting displacement amount calculating section 6, and rotation condition storing section 8, calculates a correction value by executing the processing shown in FIG. 2, and transmits the calculated correction value data to the NC device 17.

Concretely, as shown in the same figure, the correction value calculating section 7 receives data regarding the rotation condition of the main spindle 15 from the NC device 17 first (step S1), judges the rotation condition of the main spindle 15 (step S2), and when the main spindle 15 is rotated, receives data from the rotation condition storing section 8, judges whether or not the main spindle 15 was in a rotating condition previous to this, that is, judges whether or not the rotation of the main spindle 15 is the initial rotation (start-up rotation) (step S3), and in the case of the start-up rotation, executes the processings of step S4 onward, and in the case of the restart of the rotation, executes the processings of step S8 onward. On the other hand, when the rotation of the main spindle 15 is interrupted, the processings of step S13 onward are executed.

In step S4, the correction value calculating section 7 receives the estimated thermal displacement amount $\delta_A$ from the thermal displacement amount estimating section 5, calculates a correction value for canceling such displacement on the basis of the received estimated thermal displacement amount $\delta_A$ (step S5), and transmits the calculated correction value to the NC device 17 (step S6). In a normal machine tool 11, when the estimated thermal displacement amount $\delta_A$ of the main spindle 15 is a positive value, the correction value is in the direction in which the main spindle 15 is separated from the workpiece, that is, positive, so that the estimated thermal displacement amount $\delta_A$ and the correction value becomes equal to each other. Thereafter, until the rotation of the main spindle 15 is interrupted, the processings of step S4 through S7 are repeatedly executed (step S7).

On the other hand, in step S8, the correction value calculating section 7 receives the estimated thermal displacement amount $\delta_A$ from the thermal displacement amount estimating section 5, receives the adjusting displacement amount $\delta_c$ from the adjusting displacement amount calculating section 6 (step S9), and from the following expression:

$$\delta_D = \delta_A + \delta_c,$$

that is, $$\delta_D = (\alpha \times \Delta K_{tc} + \beta) + \Delta Z \times \exp(-t_c/T_c),$$

calculates the correction displacement amount $\delta_D$, calculates a correction value for canceling thermal displacement of the main spindle 15 on the basis of the calculated correction displacement amount $\delta_D$ (step S10), and transmits the obtained correction value to the NC device 17 (step S11).

The abovementioned $\Delta K_{tc}$ is the temperature data at the same time as $t_c$. For the same reason as mentioned above, the correction displacement amount $\delta_D$ and correction value becomes equal to each other.

Thereafter, until the rotation of the main spindle 15 is interrupted, the processings of step S8 through S12 are repeatedly executed in order (step S12). Thus, the correction displacement amount $\delta_D$ that can be obtained by repeatedly executing the processings of step S8 through S12 is expressed by a curve after the restart of the rotation as shown by the dashed line in FIG. 3. In FIG. 3, for easy understanding, the actual displacement curve (the chain double-dashed line) of the main spindle 15 after the restart of the rotation and the curve (the dashed line) of the correction displacement amount $\delta_D$ are drawn so as not to overlap each other, however, by properly setting the time constant $T_c$, the curve showing the correction displacement amount $\delta_D$ can be approximated to the curve of the actual displacement curve.

In steps S7 and S12, when it is judged that the rotation of the main spindle 15 has been interrupted, the process progresses to step S17, and when the operation of the machine tool 11 has been finished, the processing is ended, and when the operation of the machine tool 11 has been continued, the processings of step S1 and onward are repeated.

In step S2, in the case where it is judged that the rotation of the main spindle 15 is being interrupted, data is received from the rotation condition storing section 8, and it is judged whether or not main spindle 15 previous to this was in a rotating condition, that is, whether or not the rotation of the main spindle 15 was interrupted after the main spindle 15 was rotated (step S13), and in the case where the rotation of the main spindle 15 was interrupted after the main spindle 15 was rotated, the process progresses to step S14, and when the rotation of the main spindle 15 was not interrupted after the main spindle 15 was rotated, that is, the main spindle 15 was never rotated after start-up thereof, the process progresses to step S17. In step S14, data of $\delta_B$ calculated by the adjusting displacement amount calculating section 6 is read-in, a correction value for canceling thermal displacement of the main spindle 15 during the interruption is calculated on the basis of this $\delta_B$, (step S15), and the obtained correction value is transmitted to the NC device 17 (step S16).

The abovementioned $\delta_B$ is obtained from an expression that has been experientially lead out as mentioned above, and $\delta_B$ (displacement amount) calculated from such an calculation expression is approximate to the actual displacement amount of the main spindle 15 that has interrupted the rotation. Therefore, by using this $\delta_B$ (displacement amount), a more accurate correction value can be calculated for thermal displacement of the main spindle 15 during the interruption of the rotation. Thereby, setting of a tool offset value after replacing the tool or workpiece measurements on the machine tool that are carried out during the interruption of the rotation of the main spindle 15 can be carried out with high accuracy.

Thus, according to the apparatus 1 for calculating the correction value of the present embodiment thus constructed, when the main spindle 15 is continuously rotated without interruption after start-up thereof, a correction value is calculated on the basis of the the estimated thermal displacement amount $\delta_A$ that has been estimated by the thermal displacement amount estimating section 5 alone, and on the other hand, when the rotation of the main spindle 15 is restarted after interruption thereof, an amount $\Delta Z_{tB}$ of displacement delay occurring due to the interruption of the rotation of the main spindle 15 is estimated, and an adjusting displacement amount $\delta_c$ is calculated on the basis of the estimated displacement delay amount $\Delta Z_{tB}$, the correction value is calculated on the basis of a correction displacement amount $\delta_D$ obtained by addition of the calculated adjusting displacement amount $\delta_c$ to the estimated thermal displacement amount $\Delta_A$. Therefore, even in a case where, when the rotation of the main spindle 15 is restarted after interruption thereof, the actual displacement amount of the main spindle 15 has a delay amount to the displacement amount $\delta_A$ that has been estimated on the basis of the temperature measured in the vicinity of the main spindle 15, a correction value is calculated on the basis of the delay amount, whereby accurate correction can be made.

As described above, an embodiment of the invention is explained, however, needless to say, the concrete embodiment of the invention is not limited to this. More specifically, in the above embodiment, the correction value calculation section 4 is provided in a separate manner from the NC device 17, however, the construction of these are not limited, and the correction value calculation section 4 may be installed inside the NC device 17.

Furthermore, in the abovementioned embodiment, one temperature sensor 2 is provided, however, the construction is not limited to this, and needless to say, a plurality of temperature sensors 2 may be provided. In this case, the abovementioned $\delta_A$ is calculated from a calculation expression that is set in accordance with this construction.

In the above, although an estimated displacement amount $\delta_A$ after the interruption of the rotation of the main spindle 15 is calculated on the basis of the measured temperature, the construction is not limited to this, the estimated displacement amount $\delta_A$ may be calculated from a properly set approximate expression.

What is claimed is:

1. A method for calculating a correction value for thermal displacement occurring along an axis of a main spindle in a machine tool, the method comprising the steps of:

measuring a temperature in the vicinity of the main spindle;

estimating an amount of the thermal displacement on the basis of the measured temperature and a predetermined thermal displacement amount calculation expression; and calculating the correction value on the basis of the estimated thermal displacement amount, wherein, (1) when the main spindle has been continuously rotated without interruption after start-up thereof, the correction value is calculated on the basis of the estimated thermal displacement amount alone; and (2) when the rotation of the main spindle is restarted after interruption thereof, the correction value is calculated on the basis of the estimated thermal displacement amount and also an amount of displacement delay occurring due to the interruption, the amount of displacement delay being estimated as an actual displacement amount of the main spindle relative to the estimated thermal displacement amount.

2. A method as set forth in claim 1, wherein an adjusting displacement amount is calculated on the basis of the estimated displacement delay amount, and the correction value is calculated on the basis of a displacement amount obtained by addition or subtraction of the adjusting displacement amount to/from the estimated thermal displacement amount.

3. A method as set forth in claim 1 or 2, wherein the adjusting displacement amount is calculated from the following expression:

$$\delta_c = \Delta Z \times \exp(-t_c/T_c)$$

wherein $\delta_c$ is the adjusting displacement amount, $\Delta Z$ is the displacement delay amount at the restart of the rotation of the main spindle, $T_c$ is a time constant, and $t_c$ is a time elapsed from the restart of the rotation of the main spindle.

4. A method for calculating a correction value for thermal displacement occurring along an axis of a main spindle in a machine tool, the method comprising the steps of:

measuring a temperature in the vicinity of the main spindle;

estimating an amount of the thermal displacement on the basis of the measured temperature and a predetermined thermal displacement amount calculation expression; and calculating the correction value on the basis of the estimated thermal displacement amount, wherein, when the rotation of the main spindle is interrupted, an actual amount of displacement occurring along the axis of the main spindle during the interruption is estimated on the basis of an amount of the thermal displacement estimated on the basis of a temperature measured immediately before the interruption and a predetermined delay amount to the estimated thermal displacement amount, and the correction value is calculated on the basis of the estimated displacement amount.

5. A method as set forth in claim 4, wherein the amount of the displacement occurring along the axis of the main spindle during the interruption is calculated from the following expression:

$$\delta_B = \delta_{A1} \times \exp(-t_B/T_B)$$

wherein $\delta_B$ is the displacement amount, $\delta_{A1}$ is the estimated thermal displacement amount immediately before the interruption of the rotation of the main spindle, $T_B$ is a time constant, and $t_B$ is a time elapsed from the restart of the rotation of the main spindle.

6. An apparatus for calculating a correction value for thermal displacement occurring along an axis of a main spindle in a machine tool, the apparatus comprising:

temperature measuring means for measuring a temperature in the vicinity of the main spindle;

thermal displacement amount estimating means for estimating an amount of the thermal displacement on the basis of the temperature measured by the temperature measuring means and a predetermined thermal displacement amount calculation expression;

correction value calculating means for calculating the correction value on the basis of the thermal displacement amount estimated by the thermal displacement amount estimating means; and adjusting displacement amount calculating means for estimating an amount of displacement delay occurring due to the interruption which an actual displacement amount of the main spindle has to the estimated thermal displacement amount when rotation of the main spindle is restarted after interruption thereof, and calculating an adjusting displacement amount on the basis of the estimated displacement delay amount;

wherein, when the main spindle is continuously rotated without interruption after start-up thereof, the correction value calculating means calculates the correction value on the basis of the thermal displacement amount estimated by the thermal displacement amount estimating means alone;

wherein, when the rotation of the main spindle is restarted after the interruption thereof, the correction value calculating means calculates a displacement amount by adding or subtracting the adjusting displacement amount calculated by the adjusting displacement amount calculating mean to/from the thermal displacement amount estimated by the thermal displacement amount estimating means, and calculates the correction value on the basis of the displacement amount.

7. An apparatus as set forth in claim 6, wherein the adjusting displacement amount calculating means calculates the adjusting displacement amount from the following expression:

$$\delta_c = \Delta Z \times \exp(-t_c/T_c)$$

wherein $\delta_c$ is the adjusting displacement amount, $\Delta Z$ is the displacement delay amount at the restart of the rotation of the main spindle, $T_c$ is a time constant, and $t_c$ is a time elapsed from the restart of the rotation of the main spindle.

8. An apparatus as set forth in claim 6 or 7, wherein, when the rotation of the main spindle is interrupted, the correction value calculating means estimates an amount of displacement occurring along the axis of the main spindle during the interruption on the basis of an amount of the thermal displacement estimated on the basis of a temperature measured immediately before the Interruption and a predetermined delay amount to the estimated thermal displacement amount, and calculates the correction value on the basis of the estimated displacement amount.

9. An apparatus as set forth in claim 8, wherein the correction value calculating means calculates the amount of the displacement occurring along the axis of the main spindle during the interruption from the following expression:

$$\delta_B = \delta_{A1} \times \exp(-t_B/T_B)$$

wherein $\delta_B$ is the displacement amount, $\delta_{A1}$ is the estimated thermal displacement amount immediately before the interruption of the rotation of the main spindle, $T_B$ is a time constant, and $t_B$ is a time elapsed from the restart of the rotation of the main spindle.

* * * * *